(12) United States Patent
Chen et al.

(10) Patent No.: US 8,672,430 B2
(45) Date of Patent: Mar. 18, 2014

(54) ELECTRONIC DEVICE ENCLOSURE WITH BRACKET FOR DATA STORAGE DEVICE

(75) Inventors: Yong-Nian Chen, Wuhan (CN); Jing Liu, Wuhan (CN); Xin-Xiang Li, Wuhan (CN); Li-Fu Xu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 63 days.

(21) Appl. No.: 13/471,615

(22) Filed: May 15, 2012

(65) Prior Publication Data

US 2013/0057127 A1 Mar. 7, 2013

(30) Foreign Application Priority Data

Sep. 2, 2011 (CN) .......................... 2011 1 0258010

(51) Int. Cl.
*A47B 97/00* (2006.01)
(52) U.S. Cl.
USPC ...................................... 312/223.2
(58) Field of Classification Search
USPC ........... 312/223.2, 223.1; 361/379.33–679.39
See application file for complete search history.

(56) References Cited

U.S. PATENT DOCUMENTS

| 6,700,777 | B2 * | 3/2004 | Chen ........................ 361/679.33 |
| 6,930,249 | B2 * | 8/2005 | Chen et al. ..................... 174/50 |
| 6,946,602 | B1 * | 9/2005 | Gibbs et al. .................. 174/560 |
| 7,092,249 | B2 * | 8/2006 | Wang ....................... 361/679.33 |
| 7,639,488 | B2 * | 12/2009 | Tu ............................ 361/679.33 |
| 7,643,280 | B2 * | 1/2010 | Chen ........................ 361/679.33 |
| 2005/0068720 | A1 * | 3/2005 | Lambert et al. .............. 361/685 |
| 2007/0002532 | A1 * | 1/2007 | Chen et al. .................... 361/685 |
| 2011/0255235 | A1 * | 10/2011 | Chen ........................ 361/679.33 |
| 2012/0056515 | A1 * | 3/2012 | Chen et al. ................. 312/223.2 |
| 2013/0058035 | A1 * | 3/2013 | Chen et al. ............... 361/679.37 |
| 2013/0119837 | A1 * | 5/2013 | Gong ......................... 312/223.2 |
| 2013/0163182 | A1 * | 6/2013 | Guo et al. ............... 361/679.33 |

\* cited by examiner

*Primary Examiner* — Daniel Rohrhoff
(74) *Attorney, Agent, or Firm* — Altis Law Group, Inc.

(57) ABSTRACT

An enclosure includes a chassis and a bracket. The chassis includes a bottom panel, a rear panel and a side panel. The rear panel defines a latch hole. Two clamping pieces are located on the side panel. The bracket is engaged between the clamping pieces and includes a first sidewall and a second sidewall. A second hook and a resilient piece are located on the first sidewall. A first hook is located on the second sidewall. The first hook and the second hook are separately engaged with the two clamping pieces for preventing the bracket from moving along a first direction near to the bottom panel. The resilient piece is engaged in the latch hole to preventing the bracket from moving a second direction opposite to the first direction, and the resilient piece is elastically deformable to disengage from the latch hole.

14 Claims, 3 Drawing Sheets

ELECTRONIC DEVICE ENCLOSURE WITH BRACKET FOR DATA STORAGE DEVICE

BACKGROUND

1. Technical Field

The present disclosure relates to enclosures, and particularly to an enclosure configured to mount a data storage device.

2. Description of Related Art

A plurality of data storage devices are mounted on an chassis of a server or a large computer. The data storage device may be received in a bracket. The bracket defines a plurality of securing holes. The chassis defines a plurality of threaded holes corresponding to the plurality of the securing holes in the bracket. Fixing members are inserted into the plurality of threaded holes and the plurality of securing holes. Thus, the bracket is installed on the chassis. However, the assembling and disassembling of the bracket to the chassis may be time-consuming and inconvenient.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
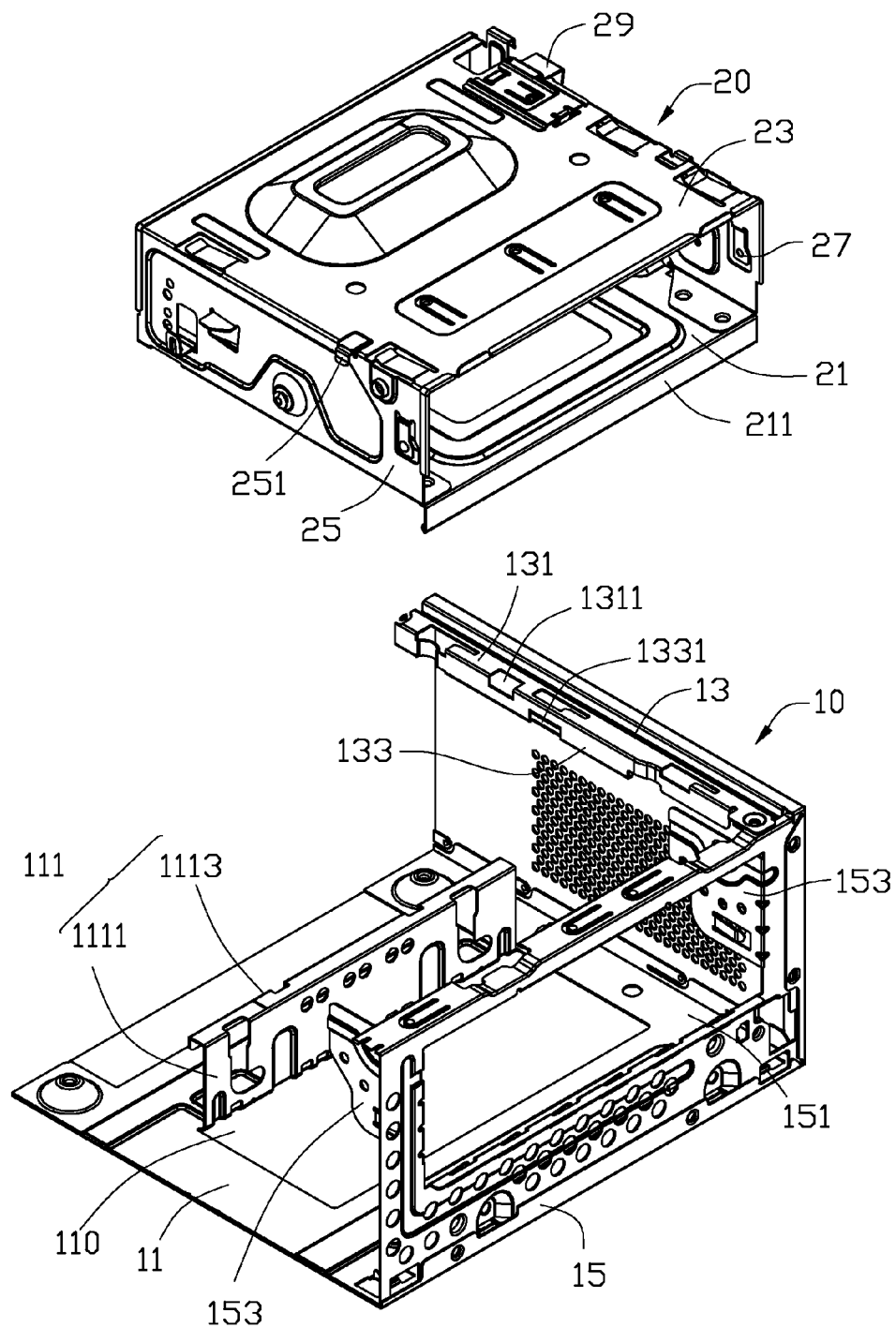
FIG. 1 is an exploded, isometric view of an embodiment of an enclosure, the enclosure comprising a chassis and a bracket.

Referring to FIG. 1, one embodiment of an enclosure in accordance includes a chassis 10 and a bracket 20 secured to the chassis 10. The bracket 20 is configured to secure a data storage device (not shown) such as a hard disk drive, a floppy disk drive, or a CD-ROM drive.

The chassis 10 includes a bottom panel 11, a rear panel 13, and a side panel 15 located on the bottom panel 11. In one embodiment, the rear panel 13 is perpendicularly connected to the side panel 15 and perpendicular to the bottom panel 11. The bottom panel 11 defines a ventilation hole 110. The supporting board 111 is located on the bottom panel 11. The supporting board 111 includes a positioning piece 1111 and a supporting piece 1113. The positioning piece 1111 extends inwards from an edge of the ventilation hole 110. In one embodiment, the positioning piece 1111 is substantially perpendicular to the bottom panel 11 and parallel to the side panel 15. A supporting piece 1113 extends outwardly from a distal end of the positioning piece 1111. In one embodiment, the supporting piece 1113 is substantially perpendicular to the positioning piece 1111 and parallel to the bottom board 11.

The first flange 131 extends inwards from a distal end of the rear panel 13. A second flange 133 extends downwardly from a distal end of the first flange 133. A stopping hole 1311 is defined in the first flange 131 and extends to the second flange 133. A latch hole 1331 is defined in the second flange 133.

The side panel 15 defines an opening 151. The opening 151 may be rectangular. A clamping piece 153 at either side of the opening 151 extends inwards from the side panel 15. In one embodiment, the two clamping pieces 153 are parallel to each other and substantially perpendicular to the side panel 15.

Figure 2:
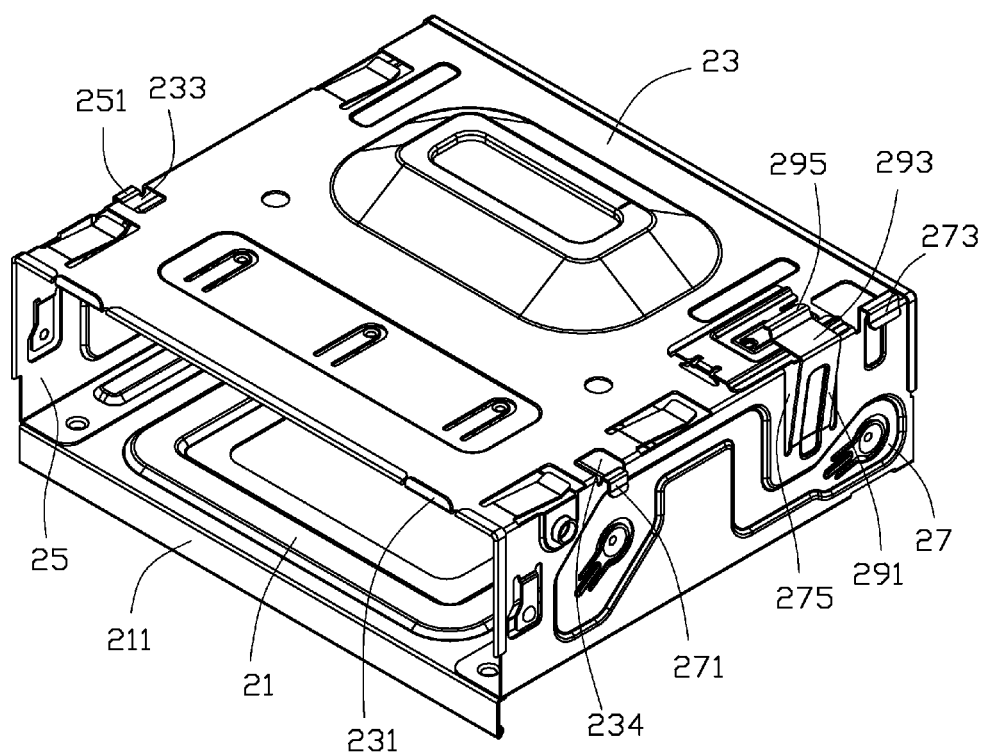
FIG. 2 is an isometric view of the bracket of FIG. 1.
Figure 3:
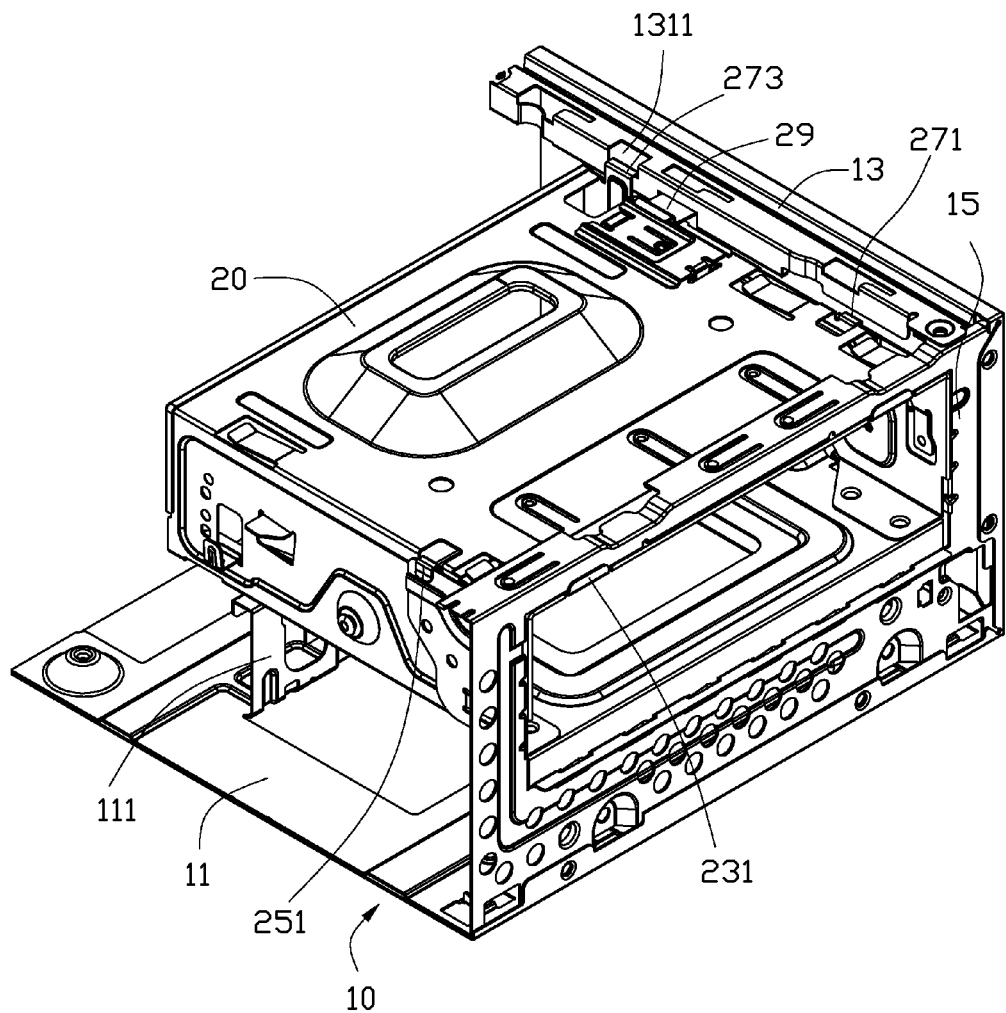
FIG. 3 is an assembled view of the enclosure of FIG. 1.

Referring to FIGS. 1 and 2, the bracket 20 includes a bottom wall 21, a top wall 23, a first sidewall 27 and a second sidewall 25. In one embodiment, the second sidewall 25 is substantially parallel to the first sidewall 27 and perpendicularly connected to the bottom wall 21 and to the top wall 23, and the bottom wall 21 is substantially parallel to the top wall 23. The bottom wall 21, the top wall 23, the second sidewall 25, and the first sidewall 27 cooperatively define a receiving space (not labeled) to receive the data storage device.

A resisting piece 211 extends downwards from a free edge of the bottom wall 21. Two tabs 231 extend upwards from a free edge of the top wall 23. The top wall 23 defines a first cutout 233 extending to the second sidewall 25 and a second cutout 234 extending to the first sidewall 27. A first hook 251 is located on the second sidewall 25 and placed at an edge of the first cutout 233. A second hook 271 is located on the first sidewall 27 and placed at an edge of the second cutout 234. A third hook 273 is located on the first sidewall 27. The first sidewall 27 defines a receiving hole 275. A resilient piece 29 is obliquely located on the first sidewall 27 and placed at the bottom edge of the receiving hole 275.

The resilient piece 29 includes a resilient portion 291, an engaging portion 293 and an operating portion 295. The resilient portion 291 is connected to the first sidewall 27. In one embodiment, an acute angle is defined between the second sidewall 27 and the resilient portion 291. The engaging portion 293 extends inwards from a distal end of the resilient portion 291. In one embodiment, the engaging portion 293 is substantially perpendicular to the resilient portion 291. The operating portion 295 extends from a distal end of the engaging portion 295.

In assembly, one side of the bracket 20 is inserted slantwise into the chassis 10 until the two tabs 231 extend through the opening 151 of the side panel 15 and engage with the side panel 15 for preventing the bracket 20 from moving along a first direction away from the bottom panel 11. The opposite side of the bracket 20 is pressed, and the bracket 20 is inserted into the chassis 10. The second flange 133 deforms the resilient portion 291 to be received in the receiving hole 275, until the engaging portion 293 is aligned with the latch hole 1331. Once aligned, the resilient portion 291 elastically returns to the engaging portion 293 and engages into the latch hole 1331. Each of the first hook 251, the second hook 271, and the third hook 273 separately engage with each of the two clamping pieces 153 and the stopping hole 1331, for preventing the tray 20 from moving along a second direction opposite to the first direction. The resisting piece 211 abuts on an inner side of the side panel 15. The bottom panel 11 abuts the supporting piece 1113. The bracket 20 is thereby installed on the chassis 10.

In disassembly, the resilient portion 291 is elastically deformed to disengage the engaging portion 293 from the latch hole 1331 by pulling back on the operating portion 295 with a fingernail. The third hook 273 is disengaged from the stopping hole 1311, and the bracket 20 is slanted to disengage the two tabs 231 from the side panel 15 and be moved away from the side panel 15. The bracket 20 is thus detached from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An enclosure comprising:
    a chassis comprising a bottom panel, a rear panel connected to the bottom panel, a side panel connected to the bottom panel and the rear panel, and two clamping pieces extending from the side panel;
    a bracket engaged between the two clamping pieces, the bracket comprising a first sidewall, a second sidewall opposite to the first sidewall, a second hook and a resilient piece located on the first sidewall, and a first hook located on the second sidewall; and
    wherein the rear panel defines a latch hole, the resilient piece is engaged in the latch hole to prevent the bracket from moving a first direction away from the bottom panel, and the resilient piece is elastically deformable to disengage from the latch hole, the first hook and the second hook are separately engaged with the two clamping pieces to prevent the bracket from moving along a second direction opposite to the first direction;
    the resilient piece comprises a resilient portion connected to the second sidewall, and an acute angle is defined between the first sidewall and the resilient portion;
    the resilient piece further comprises an engaging portion extending from the resilient portion, and the engaging portion is engaged in the latch hole and is capable of disengaging from the latch hole by elastically deforming the resilient portion, and
    the engaging portion is substantially perpendicular to the resilient portion.

2. The enclosure of claim 1, wherein the bracket further comprises a third hook located on the second sidewall, the rear panel defines a stopping hole, and the third hook is engaged in the stopping hole.

3. The enclosure of claim 1, wherein the two clamping pieces are parallel to each other and substantially perpendicular to the side panel.

4. The enclosure of claim 1, wherein the first sidewall defines a receiving hole, and the resilient portion is elastically deformed to be received in the receiving hole.

5. The enclosure of claim 1, wherein chassis further comprises a supporting board located on the bottom panel, the bracket further comprises a bottom wall connected to the first sidewall and the second sidewall, and the bottom wall abuts the supporting board.

6. The enclosure of claim 5, wherein the supporting board comprises a positioning piece perpendicular to the bottom panel and a supporting piece perpendicularly extending from the positioning piece, and the supporting piece is substantially parallel to the bottom panel.

7. The enclosure of claim 5, wherein the bracket further comprises a top wall opposite to the bottom wall, and two tabs located on a free edge of the top wall, the side panel defines an opening, and the two tabs extend through the opening to engage with the side panel.

8. An enclosure comprising:
    a chassis comprising a bottom panel, a rear panel connected to the bottom panel, and a side panel connected to the bottom panel;
    a bracket comprising a top wall, a first sidewall perpendicular to the top wall, and a second sidewall, two tabs located on the top wall, and a resilient piece and a third hook located on the second sidewall; and
    wherein the rear panel defines a latch hole and a stopping hole, the side panel defines an opening, the resilient piece is engaged in the latch hole and can be elastically deformable to disengage from the latch hole, the two tabs extend through the opening to engage with the side panel to prevent the bracket from moving a first position away from the bottom panel, and the third hook is engaged in the stopping hole to prevent the bracket from moving along a second direction opposite to the first direction;
    the resilient piece comprises a resilient portion connected to the second sidewall, and an acute angle is defined between the first sidewall and the resilient portion;
    the resilient piece further comprises an engaging portion extending from the resilient portion, and the engaging portion is engaged in the latch hole and is capable of disengaging from the latch hole by elastically deforming the resilient portion; and
    the engaging portion is substantially perpendicular to the resilient portion.

9. The enclosure of claim 8, wherein two clamping pieces are located on the side panel, the bracket further comprises a first sidewall, a first hook located on the first sidewall, and a second hook located on the second sidewall, the first hook and the second hook being separately engaged with the two clamping pieces.

10. The enclosure of claim 9, wherein the two clamping pieces are parallel to each other and substantially perpendicular to the side panel.

11. The enclosure of claim 8, wherein the first sidewall defines a receiving hole, and the resilient portion is elastically deformed to be received in the receiving hole.

12. The enclosure of claim 8, wherein the chassis further comprises a supporting board located on the bottom panel, the bracket further comprises a bottom wall connected to the first sidewall and the second sidewall, and the bottom wall abuts the supporting board.

13. The enclosure of claim 12, wherein the supporting board comprises a positioning piece perpendicular to the bottom panel and a supporting piece perpendicularly extending from the positioning piece, and the supporting piece is substantially parallel to the bottom panel.

14. The enclosure of claim 12, wherein the bracket further comprises a top wall opposite to the bottom wall, and two tabs located on a free edge of the top wall, the side panel defines an opening, and the two tabs extend through the opening to engage with the side panel.

* * * * *